United States Patent [19]

Bernhardt et al.

[11] 4,449,239

[45] May 15, 1984

[54] METHOD AND CIRCUIT FOR SEGMENTATION OF CHARACTERS FROM A SERIALLY-READ CHARACTER SEQUENCE

[75] Inventors: Lutz Bernhardt; Wilfried Kochert, both of Constance, Fed. Rep. of Germany

[73] Assignee: Computer Gesellschaft, Konstanz mbH, Fed. Rep. of Germany

[21] Appl. No.: 300,500

[22] Filed: Sep. 9, 1981

[30] Foreign Application Priority Data

Sep. 10, 1980 [DE] Fed. Rep. of Germany ....... 3034099

[51] Int. Cl.³ .............................................. G06K 9/34
[52] U.S. Cl. .......................................... 382/9; 382/48
[58] Field of Search ...................................... 382/9, 48

[56] References Cited

U.S. PATENT DOCUMENTS

| | | | |
|---|---|---|---|
| 3,219,974 | 11/1965 | Rabinow | 382/9 |
| 3,629,826 | 12/1971 | Cutaia et al. | 382/9 |
| 4,045,773 | 8/1977 | Kadota et al. | 382/9 |
| 4,173,015 | 10/1979 | Owens et al. | 382/9 |
| 4,246,570 | 1/1981 | Kochert et al. | 382/49 |
| 4,292,622 | 9/1981 | Henrichon, Jr. | 382/9 |
| 4,379,282 | 4/1983 | Bailey | 382/9 |

*Primary Examiner*—Leo H. Boudreau
*Attorney, Agent, or Firm*—Hill, Van Santen, Steadman & Simpson

[57] ABSTRACT

A method and circuit for segmentation of characters from a serially-read character sequence scans the character sequence in a column-by-column format and intermediately stores portions or cut-outs of the scanned characters in the form of an image pattern matrix associated with each portion. The image patterns are thus offset by one column with respect to one another. For each image pattern, a coefficient memory stores several coefficients associated to the specific image pattern which are read out and summed to form a margin value which is associated with the average column of the individual image pattern matrix. A maximum value which occurs in the series of continuously formed margin values signifies a separating point for the associated column.

10 Claims, 2 Drawing Figures

METHOD AND CIRCUIT FOR SEGMENTATION OF CHARACTERS FROM A SERIALLY-READ CHARACTER SEQUENCE

BACKGROUND OF THE INVENTION

The present invention relates to a method and circuit for segmentation of characters in which portions or cut-outs of a character sequence are continuously stored in a memory in the form of an image pattern matrix.

Devices and methods for automatic character recognition must have the capability of isolating individual segments associated with separate characters within the character sequence. In those cases in which the character images are continuous for each character, and are completely surrounded by white or non-printed regions, such character segmentation causes little difficulty, because the black-free column which is present at the left and right of the character markings provides a sufficient indication for a character separation. This is known as "white column" segmentation.

This ideal case, however, occurs relatively seldom in the scanning of general scripts, and for this reason other segmenting methods known to those skilled in the art, and which are significantly more complicated, must be employed. One such conventional segmenting method is known as "white path" segmentation, wherein a white path or channel which is not necessarily vertical, but which runs continuously from the top to the bottom of the character, is sought. The white path contains no printed areas or dots and is employed to determine the separation between neighboring characters.

Another method known to those skilled in the art is the so-called "comb" segmentation method, which can be used with scripts of fixed character width. This method searches for columns with a minimum of black dots or printed areas and a column containing such a minimum is selected as a column for separating or spacing between adjacent characters.

SUMMARY OF THE INVENTION

It is an object of the present invention to provide a method and circuit for segmentation of characters from a serially-read character sequence which can be employed independently of the specific type of lettering or script in the sequence and which is also independent of the lettering or script quality and the character background.

The above object is inventively achieved in a method and circuit in which characters are scanned in a column-by-column format and portions or window-like cut-outs of each character are intermediately stored in an image pattern matrix, which encompasses several scanned columns. Successive image pattern matrices are offset by one column and coefficients specifically associated with each image pattern matrix are stored in a coefficient memory and several coefficients associated with each image pattern are read out of the memory and summed to form a margin value which is uniquely associated with the average column of the image pattern matrix from which the coefficients were obtained. A maximum value is taken from the sequence of such continuously formed margin values and is selected as the separating point for the specific column associated therewith.

If necessary, the sequence of continuously formed margin values can be smoothed out by known methods.

DESCRIPTION OF THE PREFERRED EMBODIMENTS

Figure 1:
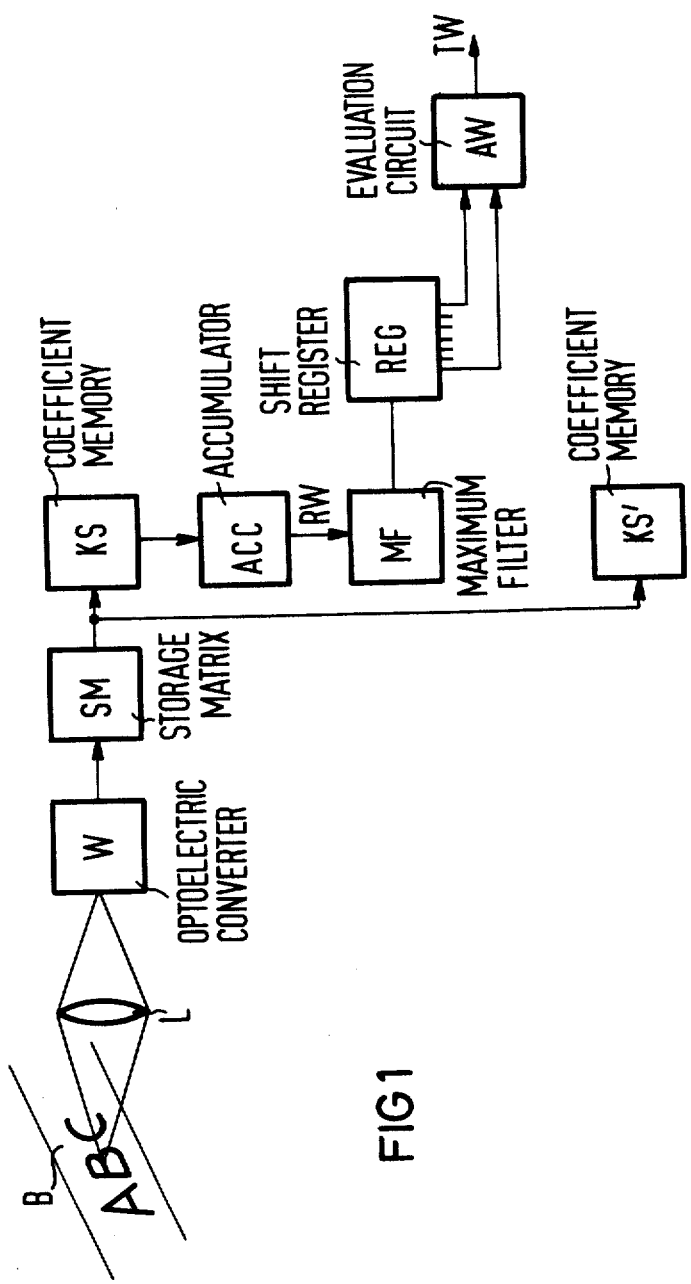
FIG. 1 is a block diagram of a circuit for conducting the method disclosed herein for segmentation of characters from a serially-read character sequence.

A simplified schematic diagram of a circuit for segmentation of characters from a serially-read character sequence is shown in FIG. 1. A printed character sequence B is scanned through a lens L and the characters are converted in conventional column-by-column format into digital signals corresponding to white and black dots comprising the sequence by an optoelectric converter W. The signals are fed column-by-column to a storage matrix SM in which a fixed window-like cut-out of the character sequence is stored in the form of a black/white image pattern or matrix. Associated with the storage matrix SM is a classifier having coefficient memory KS. The classifier may be, for example, a quadratic classifier of the type known to those skilled in the art. (For simplicity, only the coefficient memory KS is shown in FIG. 1, however, it will be understood that the classifier also includes an address memory ADM for addressing the coefficient memory KS and an arthmetic unit including an adder KF and an accumulator ACC as shown in detail in FIG. 2.) Coefficients which are uniquely associated with each image pattern stored in the matrix SM are read from the coefficient memory KS and are summed per image pattern in the accumulator ACC to form a margin value RW which is uniquely associated with the particular cut-out from which the coefficients were obtained. The reading of the coefficients may, for example, be controlled by means of the position of the black dots of the image pattern. Another means for controlling the readout is that different features are first formed from the image pattern such as, for example, the number of black dots per column, the number of black/white transitions per column, or the number of black/white transitions to the immediately following column in each case, or the number of white/black transitions to the immediately following column in each case. The reading out of the coefficients from the coefficient memory KS is controlled in dependence upon the frequency of occurrence of these features, i.e. the magnitude of the sum of such occurrences with a given image pattern. The coefficients of the memory KS are selected such that in the area of the points of separation a margin value which is as high as possible, for example close to the value 1, results, whereas in the character region, only margin values which are close to the value −1 result.

From the continuing margin value series thus obtained a maximum filter MF connected to the accumulator AC selects a maximum value and these local maximum margin values are retained with respect to location (column number) and amplitude. The margin value series may be smoothed by known methods prior to selection of the maximum. The maximum margin values are serially written into a shift register REG for further evaluation by an evaluation circuit AW. The signals are read from the shift register REG in parallel in groups of three. The evaluation circuit AW forms an output signal indicating a separation point value TW. The value TW is formed from the amplitude of each maximum margin value, as well as the spacing from the maximum margin values adjacent to the subject maximum margin value on both sides. The value TW is calculated by the following equation:

$$TW = (n_1 \cdot h_v) + (n_2 \cdot a_v) + (n_3 \cdot h_m) + (n_4 \cdot a_n) + (n_5 \cdot h_n).$$

In this equation, $h_m$ is the amplitude of the maximum margin value for the mean or average or center column in a particular image pattern, $h_v$ is the amplitude of the maximum margin value preceding $h_m$, and $h_n$ is the amplitude of the maximum margin value following $h_m$. The value $a_v$ is the spacing between the maximum margin value for which the separation point value TW is to be calculated and the preceding maximum margin value, and $a_n$ is the distance between the maximum margin value for which the separation point value TW is to be calculated and the following maximum margin value. The values $n_1$ and $n_5$ are negative numbers and $n_2$, $n_3$ and $n_4$ are positive numbers, all of which are selected according to the nature of the script to be segmented. For example, $n_1$ and $n_5$ may each be selected as $-0.5$, $n_2$ and $n_4$ may be selected as $+0.02$, and $n_3$ may be selected as $+1.2$. Utilizing these values, the separation point value TW will assume the value of 1, while in the area of the character (no separating point), values result which are approximately equal to 0. Calculations which result in a value of $0.5 \pm \epsilon$ are evaluated as an uncertain decision. The factor $\epsilon$ is a threshold value which may be selected, for example, as 0.2. For such uncertain decisions, a second coefficient memory KS' is employed which undertakes generation of a second margin value series in the same manner as the above-described first margin value series was calculated. For this purpose, elements identical to those post-connected to the coefficient memory KS are post-connected to the second coefficient memory KS', although those elements are not shown in FIG. 1. The second coefficient memory KS', and the circuitry post-connected thereto, are thus employed only in unusual cases and may preferably contain coefficients for image windows or cut-outs which are difficult to segment.

Figure 2:
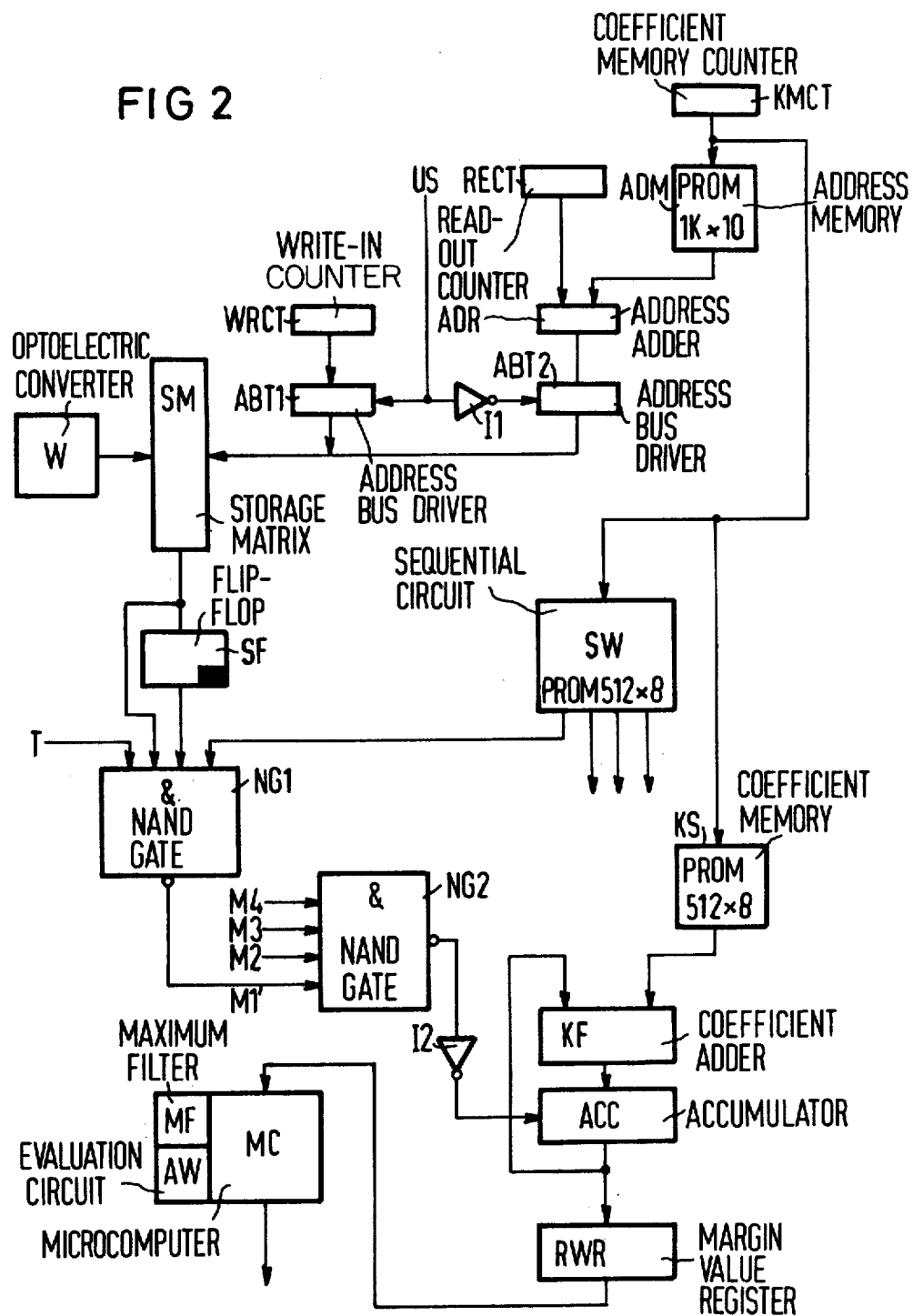
FIG. 2 is a more detailed circuit diagram of the circuit shown in FIG. 1.

Further details of the operation of the circuit shown in FIG. 1 are shown in the more detailed circuit diagram depicted in FIG. 2. As stated above, the character sequence is read column-by-column by an optoelectric converter W and is written into a memory matrix SM in digital form. In the memory matrix SM, a fixed window-like cut-out of the character sequence is stored in the form of a black/white image pattern. A write-in counter WRCT provides the specific actual addresses for the storage matrix SM. After reading in of the specific image pattern, a switch-over takes place from the write-in counter WRCT to a read-out counter RECT. This is undertaken by the operation of an address bus driver ABT1 associated with the write-in counter WRCT, and an address bus driver ABT2 associated with the readout counter RECT. A switch-over signal US is alternately generated by the write-in counter WRCT and the readout counter RECT in that following the reading in of an image pattern to the storage matrix SM, a switch-over is automatically effected to the readout mode, and vice versa. An inverter I1 is connected preceding the address bus driver ABT2.

The addresses for the readout from the memory matrix SM are generated by an address adder ADR. This address is formed from a fixed address provided from the readout counter RECT and a relative address which is received from the aforementioned feature address memory ADM. The reading out of the relative address is controlled by means of a coefficient memory counter KMCT.

The output of the storage matrix SM is connected directly to one input of a NAND gate NG1, and is connected to another input of the NAND gate NG1 through a synchronizing flip-flop SF. The NAND gate NG1 has a further input connected to a clock pulse T, and another input connected to one output of a sequential circuit SW. The NAND gate NG1 supplies a pulse at its output in accordance with a specific coefficient received from the sequential circuit SW, which corresponds to one feature which is used for the margin value formation such as, for example, the number of black/white transitions per image pattern column.

The sequential circuit SW is a programmable read only memory in which there is associated with each coefficient number a corresponding memory entry. Thus, if a memory entry to a specific coefficient number is present in SW, the sequential circuit SW transmits a pulse to the NAND gate NG1. The drive or control for this operation is undertaken by the coefficient memory counter KMCT, which is also connected to the sequential circuit SW. The sequential circuit SW has a separate output for each feature, such as four features M1 through M4 which is to be formed. For simplicity, only one complete connection, for the feature M1, is shown in detail, however, it will be understood that NAND gates identical to NG1 are post-connected to the sequential circuit SW for each of the other features.

All of the features are finally coupled with one another via a second NAND gate NG2 which is connected to the accumulator AKKU through an inverter I2. The aforementioned coefficient adder KF is connected before the accumlator ACC in which a classifier coefficient which is read from the coefficient memory KS is added to the intermediate sum which is in the accumulator ACC. This is undertaken as frequently as the numerical or quantitative amount of the particular feature. The reading out of the coefficient memory KS is also controlled by means of the coefficient memory counter KMCT. The final sum formed in this manner is then entered as a margin value for the particular column in a margin value register RWR. The corresponding separating point value TW is formed from the values contained in the register RWR in a microcomputer MC, which also includes the maximum filter MF and the evaluation circuit AW. This can be undertaken in the manner described in connection with FIG. 1, or each margin value may be coupled with another margin value separated from the first margin value by a selected column count and the values multiplied by selected multipliers and the products are summed. Thus for at least two different column spacings, separate margin value product sums are determined and evaluated and the specific maximum value of one of these margin value product sums is utilized as the separating point value.

An exemplary circuit of the type shown in FIG. 2 can be constructed utilizing the following commercially available elements. The address memory ADM may be a 1K×10 PROM, and the sequential circuit SW and the coefficient memory KS may be 512×8 PROMs. Other elements may be of the type identified by the following Texas Instruments catalog numbers, or equivalent elements available from other commercial sources. The counters WRCT, RECT and KMCT may be a 74LS163 counter, the drivers ABT1 and ABT2 may be a 74LS244 element, the flip-flop may be a 74LS74 flip-flop, the NAND gates NG1 and NG2 may be 74LS20 gates, the adders ADR and KF may be 74LS283 adders, the accumulator ACC may be a 74LS273 octal D-type flip-flop with clear, and the shift register RWR may be a 74LS374 octal D-type transparent latch. Finally, the microcomputer MC may be of the type 8085 available from Texas Instruments.

Although modifications and changes may be suggested by those skilled in the art it is the intention of the inventors to embody within the patent warranted hereon all changes and modifications which reasonably and properly come within the scope of their contribution to the art.

We claim as our invention:

1. A method for segmenting characters in a printed character sequence comprising the steps of:
    serially scanning said sequence in a column-by-column format for converting said characters into digital data;
    intermediately storing portions of said digital data representing equal selected windows of said sequence as respective image pattern matrices each offset by one column width with respect to each other and each having a center column;
    calculating a plurality of coefficients for each image pattern matrix according to selected characteristics of said image pattern matrix relating to the presence or absence of print in the portion of said sequence represented by said image pattern matrix;
    summing the coefficients for each image pattern matrix for obtaining a series of margin values which are respectively associated with the center column for each image pattern matrix; and
    selecting a maximum value from said series of margin values as a separating point value, and designating siad separating point value as a separating point between adjacent characters in said sequence, said separating point being specifically associated with one of said columns.

2. The method of claim 1 wherein said image pattern matrix is comprised of digital data corresponding to black and white dots in said printed character sequence and comprising the further steps of storing said coefficients in a coefficient memory and controlling the readout of said coefficients from said coefficient memory in accordance with the position of said black dots in said image pattern matrix.

3. The method of claim 1 wherein said digital data corresponds to white and black dots in said printed character sequence and wherein said selected characteristics for each image pattern matrix are the number of black dots per column, the number of black/white transitions per column, the number of black/white transitions between a column and the column immediately following, and the number of white/black transitions between a column and the column immediately following, and wherein said coefficients are stored in a coefficient memory and the readout of said coefficient memory is controlled by the magnitude of said characteristics.

4. The method of claim 1 comprising the further step of comparing said separating point value with a selected separating point value and identifying said separating point value as a separating point only if said separating point value is within a selected range surrounding said selected separating point value.

5. The method of claim 4 comprising the further steps of:
    for each separating point value within said selected range calculating a second plurality of coefficients for the image pattern matrix associated with said separating point value in said range according to selected characteristics of said image pattern matrix;
    summing the second plurality of coefficients for each image pattern matrix for obtaining a second series of margin values which are respectively associated with the average column for each image pattern matrix associated with the separating point value in said range; and
    selecting a maximum value from said second series of margin values as a separating point value.

6. The method of claim 1 wherein said step of selecting a maximum value from said series of margin values as a separating point is further defined by comparing the amplitude for each maximum value in said margin value series with the amplitude and distance measured in columns from the immediately preceding and immediately following maximum margin value, and identifying a separating point if said amplitude differences are small and said distances are large.

7. The method of claim 1 wherein said separating point value TW according to the relationship $$TW = (n_1 \cdot h_v) + (n_2 \cdot a_v) + (n_3 \cdot h_m) + (n_4 \cdot a_n) + (n_5 \cdot h_n).$$

wherein $h_m$ is the amplitude of one of said maximum margin values, $h_v$ is the amplitude of the immediately preceding maximum margin value and $h_n$ is the amplitude of the immediately following maximum margin value, $a_v$ is the distance between said one of said maximum margin values in said preceding maximum margin value, and $a_n$ is the distance between said one of said maximum margin values and said following maximum margin value, and $n_1$ and $n_5$ are selected negative coefficients and $n_2$, $n_3$ and $n_4$ are selected positive coefficients.

8. The method of claim 1 wherein said step of selecting a maximum value from said series of margin values is further defined by multiplying selected margin values by separate multipliers, said selected margin values being seperated by an equal column count, and summing the margin value-multiplier product and selecting said maximum value from the series of margin value-multiplier products as the separating point value.

9. A circuit for segmenting characters in a printed character sequence comprising:
    an optoelectric converter for scanning said printed character sequence and converting said sequence into digital data in a column-by-column format;
    a memory matrix connected to said converter for intermediately storing digital data representing a window of said character sequence in the form of a plurality of image pattern matrices displaced by one column with respect to each other;
    a means connected to said memory matrix for calculating a series of coefficients for each image pattern matrix according to selected characteristics of said image pattern matrix relating to the presence or absence of print in the portion of said character sequence represented by said image pattern matrix;

a classifier in the form of a coefficient memory for storing said selected coefficients calculated for each image pattern matrix;

a means for controlling reading out of said coefficient memory in accordance with characteristics of said image pattern matrices;

an accumulator post-connected to said coefficient memory for summing said coefficients for forming a margin value associated with each image pattern matrix; and an evaluating circuit post-connected to said accumulator for evaluating said margin values for determining a separating point value for identifying a separating point between adjacent characters in said character sequence.

10. The circuit of claim 9 further comprising:

a write-in counter and a read-out counter;

a means for alternately connecting said write-in counter and said read-out counter to said memory matrix for respectively entering data therein and reading data therefrom;

a synchronizing flip-flop connected to the output of said memory matrix;

a NAND gate having a plurality of inputs, one of said plurality of inputs being connected to the output of said synchronizing flip-flop and another of said plurality of inputs being directly connected to the output of said memory matrix;

a characteristic address memory;

an address adder for adding a fixed address from said readout counter with a relative address read out of said characteristic address memory;

a coefficient memory counter for controlling the reading out of said character address memory to said address adder;

a sequential circuit controlled by said coefficient memory counter for generating at least one signal corresponding to one of a plurality of characteristics associated with each image pattern matrix;

a second NAND gate having a plurality of inputs for receiving signals corresponding to said plurality of characteristics of said image pattern, including one input connected to the output of said first NAND gate;

an accumulator connected to the output of said second NAND gate;

a coefficient memory for storing said coefficients;

a coefficient adder for summing coefficients read out of said coefficient memory with the output of said accumulator, said accumulator being post-connected to said coefficient adder;

a margin value register for serially storing the output of said accumulator;

and a means post-connected to said margin value register for selecting a maximum value of said values stored in said margin value register and utilizing said maximum value for determining said separation point value.

* * * * *